United States Patent [19]
Hodges

[11] Patent Number: 5,644,172
[45] Date of Patent: Jul. 1, 1997

[54] VEHICLE ANTI-THEFT DEVICE

[76] Inventor: Gerald Marvin Hodges, P.O. Box 54153, Hurst, Tex. 76054

[21] Appl. No.: 356,647

[22] Filed: Dec. 15, 1994

[51] Int. Cl.$^6$ .................................................. B60R 25/04
[52] U.S. Cl. .................. 307/10.5; 180/287; 340/310.01; 340/825.69
[58] Field of Search ................................ 307/10.1–10.6; 70/DIG. 46, 256; 123/198 DB, 198 DC, 179.2; 180/287; 340/425.5, 426, 825.3–825.32, 825.34, 825.44, 825.69, 825.72, 310.01, 310.02

[56] References Cited

U.S. PATENT DOCUMENTS

| | | | |
|---|---|---|---|
| 3,849,663 | 11/1974 | Bogusz | 307/10.3 |
| 3,892,976 | 7/1975 | Tsevdos | 307/10.3 |
| 3,936,673 | 2/1976 | Kelly et al. | 307/10.3 |
| 4,110,734 | 8/1978 | Lepore et al. | 307/10.3 |
| 4,123,745 | 10/1978 | Gurgone | 307/10.3 |
| 4,143,368 | 3/1979 | Route et al. | 340/543 |
| 4,189,708 | 2/1980 | Bryll | 307/10.3 |
| 4,223,298 | 9/1980 | Bernier | 307/10.3 |
| 4,240,516 | 12/1980 | Henderson et al. | 180/289 |
| 4,291,237 | 9/1981 | Kitano | 307/10.3 |
| 4,291,296 | 9/1981 | Seifers | 307/10.3 |
| 4,301,442 | 11/1981 | Croissant | 307/10.2 |
| 4,315,160 | 2/1982 | Levine | 307/10.3 |
| 4,413,261 | 11/1983 | Greenberg | 340/825.72 |
| 4,435,649 | 3/1984 | Vandigriff | 307/10.3 |
| 4,507,644 | 3/1985 | Abrahamson | 307/10.3 |
| 4,538,135 | 8/1985 | Turner | 307/10.3 |
| 4,553,127 | 11/1985 | Issa | 307/10.3 |
| 4,636,651 | 1/1987 | Kilgore | 307/10.3 |
| 4,653,605 | 3/1987 | Goren | 307/10.3 |
| 4,740,775 | 4/1988 | Price | 307/10.3 |
| 4,751,396 | 6/1988 | Daigle et al. | 340/543 |
| 4,792,789 | 12/1988 | Matsumuro | 340/692 |
| 4,794,368 | 12/1988 | Grossheim et al. | 340/426 |
| 4,835,407 | 5/1989 | Kataoka et al. | 307/10.5 |
| 4,914,314 | 4/1990 | Hirtz | 307/10.3 |
| 4,928,778 | 5/1990 | Tin | 180/287 |
| 4,992,670 | 2/1991 | Pastor | 307/10.3 |
| 5,079,435 | 1/1992 | Tanaka | 307/10.2 |
| 5,079,436 | 1/1992 | Elkins | 307/10.2 |
| 5,129,376 | 7/1992 | Parmley | 123/179.2 |
| 5,132,660 | 7/1992 | Chen et al. | 340/425.5 |
| 5,132,661 | 7/1992 | Pinnow | 340/825.31 |
| 5,160,914 | 11/1992 | Sato | 340/426 |
| 5,184,023 | 2/1993 | Carlo et al. | 307/10.3 |
| 5,191,228 | 3/1993 | Sloan | 307/10.3 |
| 5,202,580 | 4/1993 | Janssen | 307/10.3 |
| 5,444,430 | 8/1995 | McShane | 340/426 |
| 5,473,200 | 12/1995 | Woo | 307/10.2 |

*Primary Examiner*—Richard T. Elms
*Attorney, Agent, or Firm*—Randall C. Brown; Locke Purnell Rain Harrell

[57] ABSTRACT

A vehicle anti-theft device for securing a vehicle is provided. The anti-theft device includes a plurality of control units electrically coupled between the vehicle electrical system and vital electrical components of the vehicle for controlling the delivery of power to these components. The control units normally interrupt power to these components but provide a path of power upon receiving an activation signal. The control units are directly coupled between the vehicle electrical system and the controlled electrical components and are powered by the vehicle electrical system. The anti-theft device also includes a transmitter device for transmitting an activation signal to the control units. When the control units receive this signal, they switch power to their respective components to allow their operation. The signal transmitted by the transmitter device is an audio frequency signal or a low power FM broadcast signal which is not widely broadcast remote from the vehicle.

10 Claims, 3 Drawing Sheets

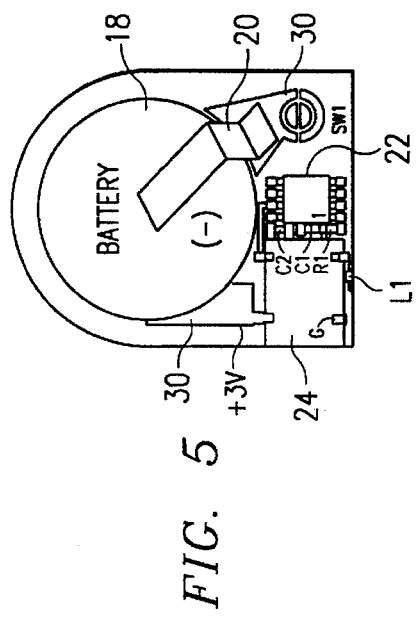
FIG. 5
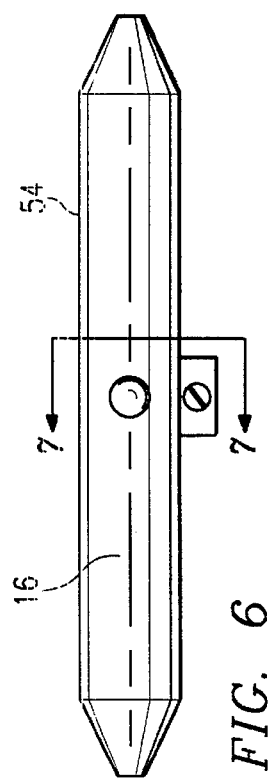
FIG. 6
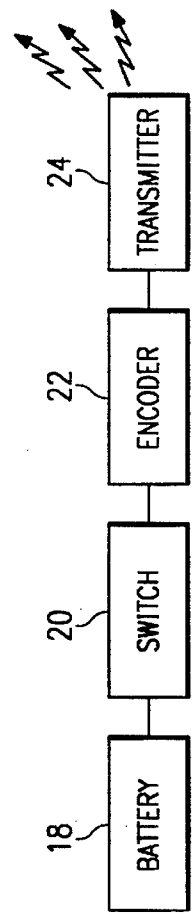
FIG. 7
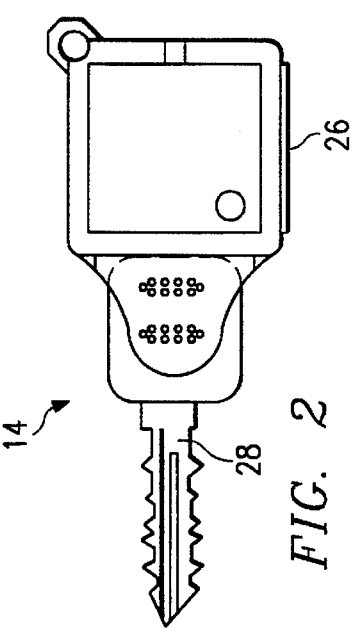
FIG. 2
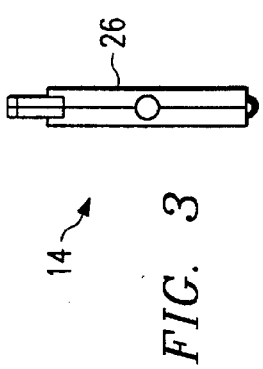
FIG. 3
FIG. 4

VEHICLE ANTI-THEFT DEVICE

BACKGROUND OF THE INVENTION

1. Field of the Invention

The present invention is related to an anti-theft device for use in securing a vehicle, and more particularly to an anti-theft device which selectively enables and disables vital electrical components powered by a vehicle's electrical system.

2. Description of the Prior Art

Various anti-theft devices have been developed to secure automobiles and other vehicles. Known prior art anti-theft devices typically include a central control unit and a plurality of disabling circuits. The central control unit is powered by the vehicle's battery and is typically attached to the interior of the vehicle. The disabling circuits are directly wired to the central control unit and are coupled with various electrical components of the vehicle for controlling the delivery of power to these components. The disabling circuits normally disable the operation of the controlled vehicle components. Once a predetermined code is entered into the central control unit, an enabling signal is transmitted to the disabling circuits to switch power to the controlled vehicle components. The enabling signal is transmitted over the wires connecting the disabling circuits to the central control unit.

Prior art anti-theft devices suffer from several limitations that limit their utility. For example, since the central control units of prior art anti-theft devices are directly wired to the vehicle battery, they are easy to locate and disable. A thief can easily trace the wiring leading from the vehicle battery or fuse box back to the central control unit and disable the anti-theft device. Similarly, since the central control units are directly wired to the disabling circuits, the disabling circuits can also be easily located and disabled by tracing the wires leading from the central control units. Thus, a thief locates the central control unit, he or she can follow the direct wiring to the disabling circuits and disconnect them from the vehicle. This allows a thief to quickly and easily circumvent the anti-theft device.

Another limitation of prior art anti-theft devices is that they are difficult and costly to install due to the direct wiring.

To avoid the problems associated with anti-theft devices using direct wiring and central control units, wireless anti-theft devices have been developed. Typical wireless anti-theft devices include a plurality of disabling circuits connected to vital components of the vehicle which are controlled by a wireless transmitter. The transmitter transmits either an activation or deactivation signal to the disabling circuits to either arm or disarm the disabling circuits. Although prior art wireless anti-theft devices solve some of the problems associated with direct wired anti-theft devices, they also suffer from several limitations. For example, although these wireless anti-theft devices are not controlled by central control units, their disabling circuits are directly wired to a central power unit for receiving power. Accordingly, these wireless disabling circuits are also easy to locate and disable by tracing the wire leading from the central power unit.

Another limitation of prior art wireless systems is that their disabling circuits are activated by an activation signal which is a widely broadcast standard FM signal or infrared signal. These widely broadcast signals propagate over long distances and can be easily intercepted and copied with a conventional receiver and recorder. The copied signal can then be rebroadcast to disable the disabling circuits of the wireless anti-theft device. Thus, prior art wireless anti-theft devices are also easy to circumvent.

Accordingly, there is a need for an improved vehicle anti-theft device that overcomes the limitations of prior art anti-theft devices. More particularly, there is a need for a vehicle anti-theft device that is easy to install and difficult to circumvent.

SUMMARY OF THE INVENTION

The present invention overcomes the problems outlined above and provides an improved vehicle anti-theft device that is easy to install and difficult to circumvent. The preferred vehicle anti-theft device broadly includes a transmitter device for transmitting a coded activation signal and a plurality of control units coupled directly between the vehicle electrical system and certain vital electrical components of the vehicle. The control units are configured for selectively enabling the delivery of power to the electrical components in response to the transmitted activation signal.

In more detail, the transmitter device is preferably mounted in a hollow housing attached to the vehicle's ignition key and includes a self-contained battery source, a switch, and a miniature transmitter. The transmitter device is operable to transmit a digital encoded activation signal when the operator of the vehicle depresses the switch. The encoded activation signal is transmitted as a low-power encoded audio frequency signal or a low-power FM broadcast signal.

The preferred transmitter device transmits an activation signal that is broadcast in the vicinity of the vehicle only and not widely broadcast remote from the vehicle. In a second embodiment of the invention, the activation signal is transmitted only over the electrical system of the vehicle.

At least one control unit is directly coupled between the vehicle electrical system and a vital electrical component of the vehicle. The control unit is powered directly from the power delivered to the controlled electrical component and is configured for selectively controlling the delivery of power to the electrical component in response to the activation signal transmitted by the transmitter device.

Each control unit includes a receiver, a decoder/comparator and a switch. The receiver is operable for receiving the activation signal from the transmitter device. The decoder/comparator is operably coupled with the receiver and is configured for comparing the received activation signal to a known stored signal. The switch is coupled between the vehicle electrical system and the corresponding vehicle electrical component and is configured for selectively enabling the delivery of power to the corresponding vehicle electrical component. The switch is normally open so that no power passes to the electrical component. The switch is operably coupled and responsive to the decoder/comparator for switching power to the electrical component when the received activation signal matches the known stored signal. The switch latches closed when the proper signal is received and remains latched until the delivery of power is disrupted to the controlled component of the vehicle.

In preferred forms, a plurality of control units are coupled with a plurality of vital electrical components powered by the vehicle electrical system. For example, control units may be coupled with the vehicle's electric fuel pump, starter solenoid, ignition coil, engine control computer, electronic fuel injection, and electronic transmission control.

With the above described construction, numerous advantages are obtained. For example, since the preferred vehicle anti-theft device does not include a central control unit, the device is difficult to locate and disable. Additionally, since the control units each include their own receiver and switch and are powered directly by the power delivered to their corresponding vehicle components, they can be randomly placed throughout the vehicle and are thus easily concealed within the vehicle's wiring harness.

Another advantage is that the preferred transmitter transmits a low power activation signal which is not widely broadcast through the air. Accordingly, the activation signal cannot be easily copied and rebroadcast to defeat the anti-theft device. Additionally, since the activation signal is transmitted to the control units over a wireless path, the anti-theft device is easy and inexpensive to install.

Another advantage is that the switch is normally open and switches power to the electrical component only when the receiver receives the proper activation signal. Once activated, the switch remains latched closed until the delivery of power is disrupted to the controlled component of the vehicle. Thus, the transmitter only has to transmit a single activation signal rather than a plurality of enabling and disabling signals.

BRIEF DESCRIPTION OF THE DRAWING FIGURES

A preferred embodiment of the present invention is described in detail below with reference to the attached drawing figures, wherein:

FIG. 2 is a top view of the transmitter device shown installed in the head of an ignition key;

FIG. 3 is an end view of the transmitter and ignition key illustrated in FIG. 2;

FIG. 4 is a block diagram illustrating the components of the transmitter device;

FIG. 5 is a circuit diagram illustrating the electronics of the transmitter device in more detail;

FIG. 6 is top view of a control unit;

FIG. 7 is a sectional view of a control unit taken along line 7—7 of FIG. 6;

DETAILED DESCRIPTION OF THE PREFERRED EMBODIMENTS

Figure 1:
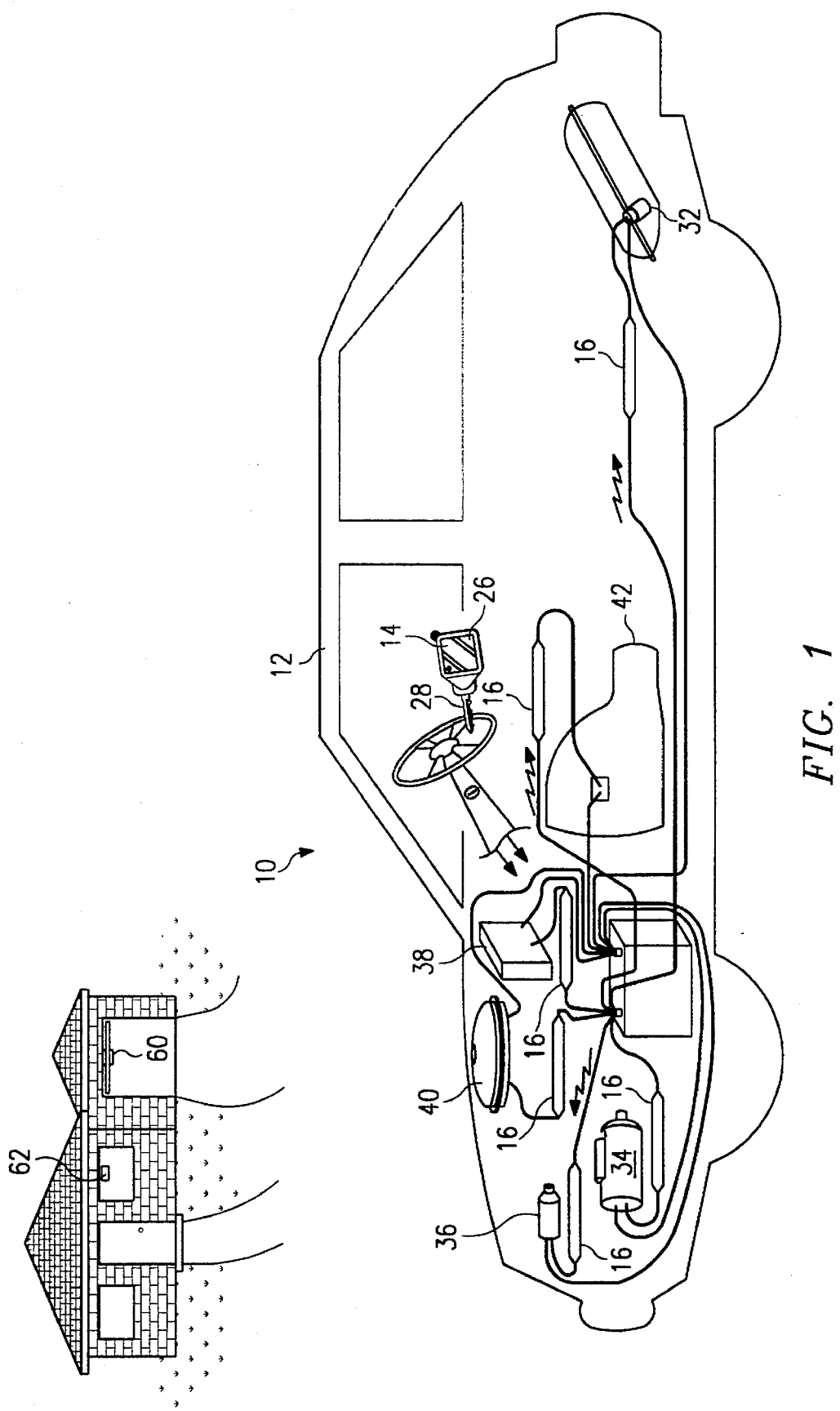
FIG. 1 is a schematic view depicting a vehicle anti-theft device constructed in accordance with the preferred embodiment shown connected to an automobile.

Turning now to the drawing figures, FIG. 1 illustrates a vehicle anti-theft device 10 constructed in accordance with the preferred embodiment of the present invention. Vehicle anti-theft device 10 is configured for use in an automobile 12 or other vehicle for securing the vehicle from tampering and theft.

Anti-theft device 10 broadly includes a transmitter device 14 for transmitting a coded activation signal and at least one control unit 16 for controlling the delivery of power to vital electrical components powered by the vehicle's electrical system. As described in more detail below, control unit 16 selectively enables or disables the delivery of power to the vehicle's electrical components in response to the transmitted activation signal.

In more detail, transmitter device 14 includes battery 18, switch 20, encoder 22, and transmitter 24 (see FIGS. 4 and 5). Transmitter device 14 is preferably mounted in a keyhead housing 26 (see FIG. 2) which includes mating first and second housing portions. Housing 26 is preferably attached to the head of a conventional ignition key 28 and is formed of synthetic resin materials. Transmitter device 14 is activated by the operator of the vehicle when the ignition key 28 is inserted into the vehicle ignition system.

FIG. 4 is a block diagram illustrating the general operation of transmitter device 14. When activated, switch 20 delivers power from battery 18 to encoder 22. An encoded digital activation signal is stored in encoder 22. Encoder 22 delivers the encoded activation signal to transmitter 24 which transmits the signal to control units 16 as described below.

FIG. 5 is a circuit diagram illustrating in more detail the actual components of transmitter device 14. Although a preferred embodiment of transmitter 14 is illustrated and described herein, it is to be understood that other components can be substituted to perform the same function as the preferred transmitter.

Battery 18 is provided for powering the remaining components of transmitter device 14 and is positioned between a pair of conventional electrical terminals 30. Battery 18 is preferably a conventional miniature 3 volt DC battery such as manufactured by Panasonic Technologies, Inc.

Switch 20 is coupled between battery 18 and encoder 22 and is operable for closing the electrical circuit between electrical terminals 30. Accordingly, switch 20 controls the delivery of power to encoder 22. Switch 20 is a conventional two-position push button control switch such as manufactured by Switchcraft, Inc.

Encoder 22 is coupled between switch 20 and transmitter 24 and is operable for storing and delivering an encoded digital activation signal. When switch 20 is activated, encoder 22 delivers the encoded activation signal to transmitter 24. In preferred forms, encoder 22 is a solid-state security chip Model No. TMC 3637 manufactured by Texas Instruments, Inc.

Transmitter 24 is coupled with encoder 22 and is operable for transmitting the encoded activation signal delivered by encoder 22. Transmitter 24 utilizes stabilized quartz SAW technology and transmits the encoded activation signal at an FCC approved frequency such as 315 MHz. Transmitter 24 is preferably a solid-state miniature self-contained transmitter chip Model No. HX 1005 manufactured by RF Monolithics, Inc. Other transmitter circuits commonly used in similar applications may be substituted.

A resistor R1 and capacitor C1 are coupled between encoder 22 and transmitter 24 for determining the internal oscillator frequency of encoder 22. Bypass capacitor C2 is coupled between the electrical ground of transmitter device 14 and the VCC pin of encoder 22. In preferred forms, R1, C1 and C2 have values of 22K ohms, 10 pF, and 10 pF respectively.

Transmitter device 14 is operable to transmit an activation signal which is either an encoded audio frequency signal or a low power FM broadcast signal. As those skilled in the art will appreciate, audio frequency signals are modulated at such low frequencies that they do not propagate beyond the direct wiring of vehicle. Low power FM broadcast signals are sufficiently weak so that they also do not propagate much beyond the wiring of a vehicle. Accordingly, the activation signal transmitted by transmitter device 14 travels along the electrical system of vehicle or is broadcast only in the immediate vicinity of the vehicle and is not widely broadcast through the air. Thus, the activation signal cannot be easily intercepted and copied.

Anti-theft device 10 also includes at least one control unit 16 directly coupled between the vehicle electrical system and a vital electrical component powered by the vehicle electrical system. The control unit 16 is configured for selectively controlling the delivery of power to the electrical component in response to the activation signal transmitted by transmitter device 14.

In preferred forms, a plurality of control units 16 are coupled between the vehicle electrical system and a plurality of electrical components of the vehicle. For example, as illustrated in FIG. 1, control units 16 may be coupled with vehicle electric fuel pump 32, starter solenoid 34, ignition coil 36, engine control computer 38, electronic fuel injection 40, and electronic transmission control 42. Each of these control units 16 normally interrupts the flow of power from the vehicle electrical system to their respective components. To operate vehicle 12, each control unit 16 must be switched to pass power to their respective components.

Figure 8:
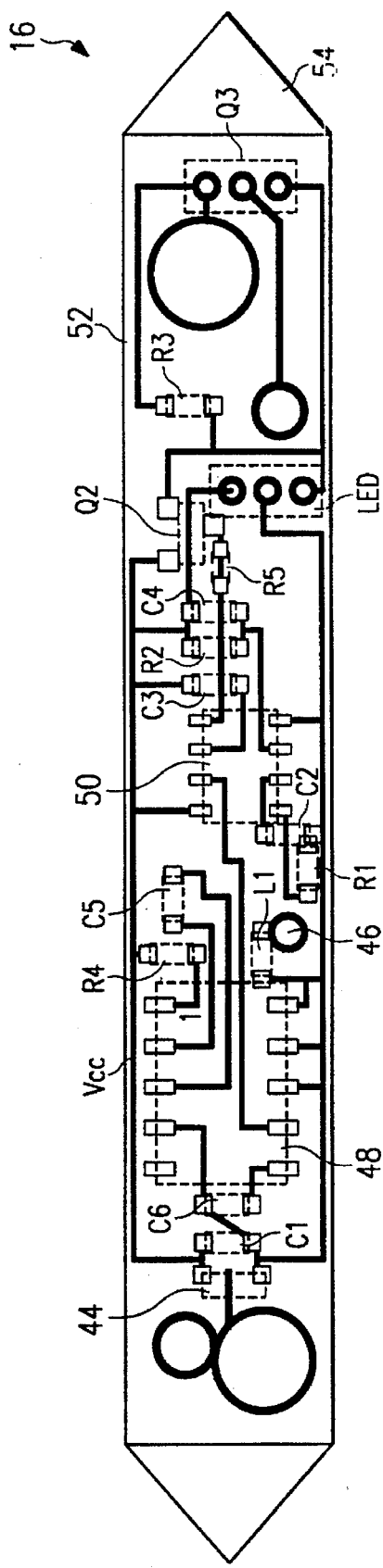
FIG. 8 is a circuit diagram illustrating the electronics of a control unit.
Figure 9:
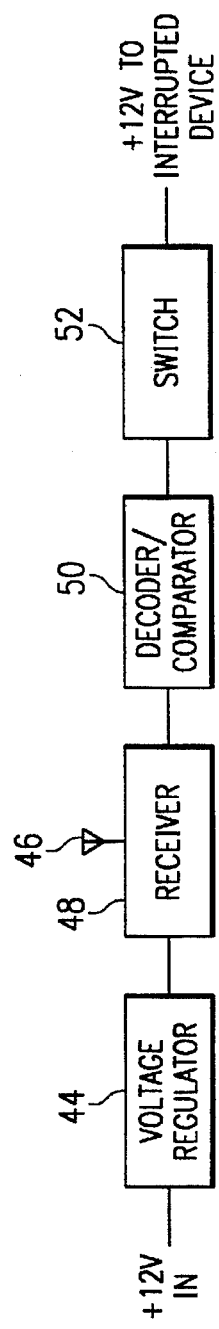
FIG. 9 is a block diagram illustrating the components of a control unit.

Referring to FIGS. 8 and 9, each control unit 16 includes voltage regulator 44, antenna 46, receiver 48, decoder/comparator 50, and switch 52. Control unit 16 is preferably mounted in housing 54 formed of synthetic resin material (see FIGS. 6 and 7). Housing 54 is cylindrical in shape and presents a diameter of less than ½". With this construction, a plurality of control units 16 can be easily installed in the wiring harness of a vehicle and can be easily concealed from view. Accordingly, once installed, control units 16 are difficult to locate and disable.

FIG. 9 is a block diagram illustrating the general operation of each control unit 16. Voltage regulator 44 is provided for controlling the voltage delivered from the vehicle electrical system to the remaining components of control unit 16. Antenna 46 and receiver 48 receive the activation signal transmitted by transmitter device 14 and deliver it to decoder/comparator 50. Decoder/comparator 50 compares the received activation signal to a known stored signal. If the activation signal matches, decoder/comparator 50 closes switch 52. Switch 52 is coupled with the corresponding electrical vehicle component for controlling the delivery of power to the vehicle component. Upon receipt of the proper activation signal, control unit 16 switches power to the controlled vehicle electrical component, thus enabling operation of the vehicle.

FIG. 8 is a circuit diagram illustrating in more detail the actual components of each control unit 16. Voltage regulator 44 is coupled directly with the vehicle electrical system and is configured for regulating the voltage delivered to the control unit 16. As those skilled in the art will appreciate, conventional car batteries operate at 12 volts. Voltage regulator 44 limits the voltage delivered to the components of control unit 16 to 5 volts or less. In preferred forms, voltage regulator 44 is a conventional regulator transistor.

Antenna 46 and receiver 48 are coupled between voltage regulator 44 and decoder/capacitor 50 and are operable for receiving the activation signal transmitted by transmitter device 14. In preferred forms, antenna 46 and receiver 48 are tuned to receive an audio frequency signal or low-power FM signal. Receiver 48 is preferably a solid-state receiver chip Model No. HX1000 manufactured by RF Monolithics, INC.

An inductor L1 is coupled between antenna 46 and receiver 48 for balancing the load to the antenna 46. As those skilled in the art will appreciate, the size of inductor L1 determines the tuning characteristics of antenna 46. In preferred forms, inductor L1 is a passthrough device with no resistance or inductance which limits the sensitivity of receiver 48.

A plurality of conventional capacitors C1 and C6 are coupled between voltage regulator 44 and receiver 48. The capacitors provide a voltage reference for receiver 48. In preferred forms, C1 and C6 have values of 100 mF and 1 mF, respectively. Additionally, resistor R4 is coupled with the 1st pin of receiver 48 for reducing the voltage delivered to receiver 48, and capacitor C5 is coupled between the 2nd and 3rd pins of receiver 48 and serves as a passthrough couple for receiver 48. In preferred forms, R4 and C5 have values of 1K ohms and 10 mF, respectively.

Decoder/comparator 50 is operably coupled with receiver 48 and is configured for comparing the received activation signal to a known stored signal. When decoder/comparator 50 receives an activation signal which matches the known stored signal, a low signal is delivered to its 5th pin. In preferred forms, decoder/comparator 50 is a conventional code interpreter circuit Model No. TMC 3637 manufactured by Texas Instruments, Inc.

A resistor R1 is coupled between the electrical ground and the first pin of decoder/comparator 50 for biasing the decoder/comparator 50. In preferred forms, R1 has a value of 22K ohms. A capacitor C2 is coupled between the electrical ground and the second pin of decoder/comparator 50 for determining the internal oscillator frequency of decoder/comparator 50. In preferred forms, C2 has a value of 0.001 mF. A capacitor C3 is coupled with the 6th pin of decoder/comparator 50 for setting the gain on the decoder/comparator amplifier. In preferred forms, C3 has a value of 100 mF. A resistor R2 and a capacitor C4 are coupled with the 3rd pin of decoder/comparator 50 for setting the pulse duration of decoder/comparator 50. In preferred forms, R2 and C4 have values of 1M ohms and 470 nF, respectively.

Switch 52 is coupled with the corresponding controlled electrical component and is operable for selectively enabling or disabling the delivery of power to the electrical component. Switch 52 normally interrupts the flow of power to the controlled electrical component and latches closed to deliver power to the electrical component when signaled by decoder/comparator 50.

Switch 52 includes a switching transistor Q2 and a silicone controlled rectifier Q3. Q2 is coupled with the 5th pin of the decoder/comparator 50 and is operable for switching voltage to the gate of Q3 upon receiving the low signal delivered by 5th pin of decoder/comparator 50. Q3 is coupled between the switching transistor Q2 and the controlled electrical component and is operable for switching a high-current output voltage to the controlled electrical component upon receiving the voltage signal from Q2. In preferred forms, Q2 is a PNP switching transistor Model No. 2N3906 manufactured by any one of a variety of electronics manufacturers, and Q3 is a conventional silicone controlled rectifier Model No. SK 5552 manufactured by RCA Corp.

In operation, anti-theft device 10 prevents tampering and theft of vehicle 12 by interrupting electrical power to one or more vital electrical components required to start and/or operate vehicle 12. A plurality of control units 16 are electrically coupled between the vehicle electrical system and electrical components of the vehicle. Control units 16 normally interrupt power to these electrical components to prevent their operation. When control units 16 receive an activation signal from transmitter device 14, they provide a source of power to their respective electrical vehicle components.

When the switch 20 of the transmitter device 14 is depressed while the vehicle ignition key 28 is inserted into the vehicle ignition, transmitter device 14 transmits an encoded activation signal to control units 16. Receiver 48 receives the encoded activation signal and decoder/comparator 50 compares it to a known stored signal. If the signals match, decoder/comparator 50 activates switch 20 which latches closed to switch power to the controlled electrical component of the vehicle. However, if the signals do not match, the switches in control units 16 remain open and prevent the vehicle from operating. Similarly, if an incorrect signal is received by receiver 48, the switches of control units 16 remain open and encoder/comparator 50 waits a predetermined amount of time before comparing a second signal. This prevents the use of code scanning devices to break the code of anti-theft device.

In a second embodiment of the invention, anti-theft device may also include a plurality of function modules (not shown). The function modules are electrically coupled with the vehicle ignition system and with conventional alarm devices such as a horn or flashing light. The function modules are similar to control units but do not include a latching switch. The function modules also include a logic circuit which detects whether the vehicle ignition power is on. The function modules are operable to receive the activation signal transmitted by the transmitter device 14. If the function modules detect ignition voltage but do not receive an activation signal from transmitter device 14, they activate the alarm. The function modules can also be used to control other functions of vehicle such as automatic door locks. For example, a function module can alternately lock and unlock the automatic door locks upon receiving activation signals from transmitting device. The function modules may also be used in conjunction with a conventional garage door opener 60. The function module may be placed in parallel with the contact closure of the garage door opener 60 to open or close the garage door in response to a signal from transmitter device 14. The function module may also be used in conjunction with a home security system 62.

Although the preferred embodiment of anti-theft device 10 does not require a central control unit, one may be provided for controlling the operation of various alarm devices. The preferred central control unit is directly wired to a plurality of devices including: a circuit connected to the vehicle dome light fuse, an interior motion detector, an exterior motion detector, and a circuit connected to the vehicle's ignition voltage source fuse. The central control unit differs from conventional central control units in that it communicates with transmitter device 14 via activation signals propagated over the vehicle electrical system.

In operation, the central control unit monitors the vehicle for an alarm condition. If the central control unit receives an activation signal from transmitter device 14 but does not detect an ignition voltage, it sets itself to the "alarm" condition. While in the "alarm" condition, the central control unit detects four specific alarm conditions: opening of the vehicle doors; motion within the interior of the vehicle; impact to the vehicle; and delivery of power to any component of the vehicle. If any of these alarm conditions occur, the central control unit activates an alarm. The central control unit is "disarmed" when it receives a second signal from transmitter device 14.

In another embodiment of the present invention, anti-theft device 10 may include an emergency notification system including a conventional cellular telephone which notifies the user or the police if vehicle 12 is disturbed. The emergency notification system is electrically coupled with the central control unit described above and is programmed to dial a preselected phone number if the central control unit detects an alarm condition.

Although the invention has been described with reference to the preferred embodiment illustrated in the attached drawing figures, it is noted that equivalents may be employed and substitutions made herein without departing from the scope of the invention as recited in 10 the claims. For example, although the anti-theft device has been illustrated and described as being used for securing a vehicle, it may be used to secure any device which has electrical components supplied by an electrical system.

Additionally, although the control units are illustrated and described as being stand alone units, they may be integrally connected to the various electrical components of vehicle 12. As those skilled in the art will appreciate, integrally connected control units are virtually undetectable, thus offering even a greater level of protection against disconnection.

Having thus described the preferred embodiment of the invention, what is claimed as new and desired to be protected by Letters Patent includes the following:

I claim:

1. An anti-theft apparatus for selectively enabling vital electrical components powered by a vehicle's electrical system, comprising:

transmitter and at leas one control unit, said transmitter transmitting directly to said at least one control unit a single coded activation signal comprising a low-power audio frequency signal propagated over the vehicle's electrical system;

wherein said transmitter is neither powered by said vehicle electrical system nor fixedly attached to the vehicle;

wherein each said at least one control unit is powered by the vehicle electrical system and is coupled directly between the vehicle electrical system and a vehicle electrical component and selectively controls the delivery of electrical power to said vehicle electrical component in response to said single coded activation signal received from said transmitter; and wherein each said at least one control unit comprises:
   a receiver for receiving said single coded activation signal transmitted by said transmitter,
   a comparator operatively coupled with said receiver for comparing said received single coded activation signal transmitted by said transmitter with a known stored signal, and
   a switch coupled between the vehicle electrical system and said vehicle electrical component for selectively enabling and disabling the delivery of power to said vehicle electrical component, wherein said switch is operably coupled and responsive to said comparator for switching power to said vehicle electrical component only when said received single coded activation signal transmitted by said transmitter matches said known stored signal.

2. An anti-theft apparatus as set forth in claim 1, wherein said electrical component is selected from the group consisting of the vehicle's electric fuel pump, electric starter solenoid, electric ignition coil, electric engine control computer, electric fuel injection and electric transmission control.

3. An anti-theft apparatus for selectively enabling and disabling vital electrical components powered by a vehicle's electrical system, comprising:

a transmitter and a plurality of control units, said transmitter transmitting directly to each of said plurality of control units a single coded activation signal comprising a low-power audio frequency signal propagated over the vehicle's electrical system;

wherein said transmitter neither powered by said vehicle electrical system nor fixedly attached to the vehicle;

(a) wherein each of said plurality of control units is powered by the vehicle electrical system and is coupled directly between the vehicle electrical system and vital electrical component of the vehicle selected from the group consisting of the vehicle's electrical fuel pump, starter solenoid, ignition coil, engine control computer, fuel injection and transmission control, each of said plurality of control units selectively control the delivery of electrical power to said electrical component in response to said single coded activation signal received from said transmitter, and each of said plurality of control units comprises:

a receiver for receiving said single coded activation signal transmitted by said transmitter, a comparator operatively coupled with said receiver for comparing said received single coded activation signal transmitted by said transmitter with a known stored signal, and a switch coupled between the vehicle electrical system and said vehicle electrical component for selectively enabling and disabling the delivery of power to said vehicle electrical component, wherein said switch is operably coupled and responsive to said comparator for switching power to a said vehicle electrical component only when said received single coded activation signal transmitted by said transmitter matches said known stored signal.

4. An anti-theft apparatus as set forth in claim 3, wherein said single coded activation signal transmitted by said transmitter is further sent to a receiver coupled with activation switch used to open and close a garage door.

5. An anti-theft apparatus as set forth in claim 3, wherein said single coded activation signal transmitted by said transmitter is further sent to a receiver coupled with an activation switch used to activate or deactivate a home security system.

6. An anti-theft apparatus for selectively enabling vital electrical components powered by a vehicle's electrical system, comprising:

a transmitter and at least one control unit, said transmitter transmitting directly to said at least one control unit a single coded activation signal comprising a low-power FM signal broadcast only within the vehicle;

wherein said transmitter is neither powered by said vehicle electrical system nor fixedly attached to the vehicle;

wherein each said at least one control unit is powered by the vehicle electrical system and is coupled directly between the vehicle electrical system and a vehicle electrical component and selectively controls the delivery of electrical power to said vehicle electrical component in response to said single coded activation signal received from said transmitter; and wherein each said at least one control unit comprises:

a receiver for receiving said single coded activation signal transmitted by said transmitter, a comparator operatively coupled with said receiver for comparing said received single coded activation signal transmitted by said transmitter with a known stored signal, and a switch coupled between the vehicle electrical system and said vehicle electrical component for selectively enabling and disabling the delivery of power to said vehicle electrical component, wherein said switch is operably coupled and responsive to said comparator for switching power to said vehicle electrical component only when said received single coded activation signal transmitted by said transmitter matches said known stored signal.

7. An anti-theft apparatus as set forth in claim 6, wherein said electrical component is selected from the group consisting of the vehicle's electric fuel pump, electric starter solenoid, electric ignition coil, electric engine control computer, electric fuel injection nd electric transmission control.

8. An anti-theft apparatus for selectively enabling and disabling vital electrical components powered by a vehicle's electrical system, comprising:

a transmitter and a plurality of control units, said transmitter transmitting directly to each of said plurality of control units a single coded activation signal comprising a low-power FM signal broadcast only within the vehicle;

wherein said transmitter is neither powered by said vehicle electrical system nor fixedly attached to the vehicle;

wherein each of said plurality of control units is powered by the vehicle electrical system and is coupled directly between the vehicle electrical system and a vital electrical component of the vehicle selected from the group consisting of the vehicle's electrical fuel pump, starter solenoid, ignition coil, engine control computer, fuel injection and transmission control, each of said plurality of control units selectively controls the delivery of electrical power to said electrical component in response to said single coded activation signal received from said transmitter, and each of said control units comprises:

a receiver for receiving said single coded activation signal transmitted by said transmitter, a comparator operatively coupled with said receiver for comparing said received single coded activation signal transmitted by said transmitter with a known stored signal, and a switch coupled between the vehicle electrical system and said vehicle electrical component for selectively enabling and disabling the delivery of power to said vehicle electrical component, wherein said switch is operably coupled and responsive to said comparator for switching power to said vehicle electrical component only when said received single coded activation signal transmitted by said transmitter matches said known stored signal.

9. An anti-theft apparatus as set forth in claim 8, wherein said single coded activation signal transmitted by said transmitter is further sent to a receiver coupled with an activation switch used to open and close a garage door.

10. An anti-theft apparatus as set forth in claim 8, wherein said single coded activation signal transmitted by said transmitter is further sent to a receiver coupled with an activation switch used to activate or deactivate a home security system.

* * * * *